United States Patent [19]

Inanaga et al.

[11] Patent Number: 5,342,500

[45] Date of Patent: Aug. 30, 1994

[54] INTERFACIAL COMPONENT DETECTION APPARATUS

[75] Inventors: Kazuhiko Inanaga; Hitoshi Ota; Shiro Yamauchi; Takashi Kawabata, all of Amagasaki, Japan

[73] Assignee: Mitsubishi Denki Kabushiki Kaisha, Tokyo, Japan

[21] Appl. No.: 135,425

[22] Filed: Oct. 12, 1993

Related U.S. Application Data

[63] Continuation of Ser. No. 773,208, Oct. 8, 1991, abandoned.

[51] Int. Cl.⁵ .............................................. G01N 27/26
[52] U.S. Cl. ..................................... 204/421; 204/424; 204/426; 204/430; 204/153.22; 204/153.18
[58] Field of Search ............... 204/421, 422, 423, 424, 204/425, 426, 427, 428, 429, 430, 153.22, 153.18

[56] References Cited

U.S. PATENT DOCUMENTS

| | | | |
|---|---|---|---|
| 4,497,701 | 2/1985 | Murata et al. | 204/430 |
| 4,562,725 | 1/1986 | Oka et al. | 204/430 |
| 4,707,244 | 11/1987 | Harmon, III et al. | 204/153.22 |
| 4,837,648 | 6/1989 | Yamauchi | 360/103 |
| 5,096,549 | 3/1992 | Yamauchi | 204/129 |
| 5,131,990 | 7/1992 | Kulwicki et al. | 204/430 |

FOREIGN PATENT DOCUMENTS

| | | |
|---|---|---|
| 58-190752 | 11/1983 | Japan . |
| 62-229568 | of 1988 | Japan . |
| 63-279162 | 11/1988 | Japan . |
| 1073581 | 3/1989 | Japan . |
| 6473581 | 3/1989 | Japan . |
| 3095746 | 4/1991 | Japan . |

*Primary Examiner*—John Niebling
*Assistant Examiner*—Bruce F. Bell
*Attorney, Agent, or Firm*—Leydig, Voit & Mayer

[57] ABSTRACT

An interfacial component detection apparatus has a plurality of electrodes spaced from one another on a first solid portion and a solid electrolytic layer on the first solid portion adjacent to an interfacial layer and covering the plurality of electrodes. An I/O device applies an electrical signal between the two electrodes and detects electrical signals from the electrodes. Components of the interfacial layer can be accurately and reliably detected by electrolysis and impedance measurements.

24 Claims, 10 Drawing Sheets

INTERFACIAL COMPONENT DETECTION APPARATUS

This application is a continuation of application Ser. No. 07/773,208, filed Oct. 8, 1991, now abandoned.

BACKGROUND OF THE INVENTION

Field of the Invention

The present invention relates to an interfacial component detection apparatus and method for detecting interfacial components such as traces of water between a head and a disk of a magnetic disk apparatus, and, more particularly, to an interfacial component detection method and an apparatus exhibiting excellent reproducibility and accuracy.

Description of the Related Art

Recently, there has arisen a desire for magnetic disk apparatus with enlarged storage capacity and reduced size. In order to meet the above-described desire, a sputtered thin film disk or the like has been used as a recording medium capable of recording data at high density. The thin film disk is suitable for raising the recording density since it has an extremely smooth flat surface. However, it encounters a problem in that water or the like can easily be condensed at the interface between the head and the disk. If water or the like is condensed as described above, the frictional force between the head and the disk is enlarged, causing the rotation of the disk to become impossible. As a result, a failure due to adhesion will take place. What is even worse, the existence of water or various ions at the interface between the head and the disk will cause corrosion of the surface of the disk.

In order to overcome the above-described problems, it is necessary to adopt measures such as an urgently stopping rotation upon directly detecting the interfacial components between the head and the disk so as to clarify the conditions (that is, the type and the quantity of each of the interfacial components) which cause the above-described problems.

Hitherto, a dew-condensation sensor of an electrostatic capacitance type has been disclosed as a means for measuring the interfacial components between the head and the disk causing the above-described problems, an example of the electrostatic capacity type dew-condensation sensor being disclosed in "Detection of Quantity of water on the Surface of Thin Film Magnetic Disk", p.p. 441, 1988, written by Yoichi Inoue and Katsuyuki Tanaka, a preliminary anthology for the 32nd spring symposium of the Japan Lubrication Society.

Figure 15:
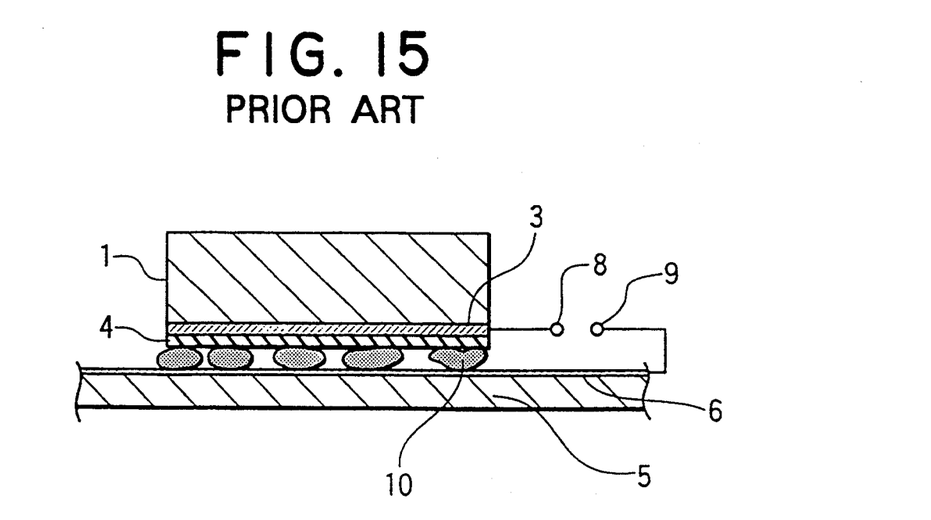
FIG. 15 is a schematic cross sectional view which illustrates a conventional interfacial component detection apparatus.

FIG. 15 is a schematic cross sectional view which illustrates a conventional device for detecting interfacial components employed in a magnetic disk apparatus disclosed in the above-described anthology.

Referring to the drawing, a first electrode 3 made of an Ag sputtered film is formed in a portion of a first solid portion 1 of a slider having a magnetic head (omitted from the illustration) therein, the first electrode 3 being disposed at a position confronting a disk (to be described later). The first electrode 3 is covered with an insulating film 4 made of $SiO_2$, the first electrode 3 and the insulating film 4 being integrally formed with the slider. A second solid portion 5 in the form of a disc has a second electrode 6 made of a conductive carbon protection film at a position confronting the slider. The second electrode 6 is integrally formed with the second solid portion 5.

A detection terminal 8 is connected to the first electrode 3, while a detection terminal 9 is connected to the second electrode 6. A interfacial layer 10 composed of, for example, water can be generated between the first solid portion 1 and the second solid portion 5.

Then, the operation of the conventional interfacial component detection apparatus shown in FIG. 15 will now be described.

First, an Ag coating is applied to the surface of the first solid portion 1 while arranging the portion of the magnetic disk apparatus adjacent to the slider to be the first solid portion 1 so that the first electrode 3 is formed. Then, the $SiO_2$ coating is applied to the same portion so that the insulating film 4 is formed. On the other hand, a disc-like conductive carbon protection film is, as the second electrode 6, formed on the second solid portion 5 while arranging the portion of the magnetic disk apparatus to be the second solid portion 5.

The interfacial components are detected in such a manner that water, that is, the interfacial layer 10 between the first and second electrodes 3 and 6 is detected as a change in the electrostatic capacity which can be detected between the terminals 8 and 9. The above-described method of detecting the interfacial layer 10 by using the electrostatic capacity exhibits an advantage in that the components of the interfacial layer 10 can be detected in a state in which the first solid portion (head) 1 and the second solid portion (disk) 5 are positioned in contact with each other. Another advantage is that the detection can be easily automated.

However, the detected electrostatic capacity is changed when there are variations in the frequency of the electrical signals applied between the detection terminals 8 and 9. Therefore, it has been very difficult to distinguish and determine the electrostatic capacity caused by water in the interfacial layer 10 from that caused by factors other than components in the interfacial layer 10. In particular, in a case where polar ions or molecules other than water are present in the interfacial layer 10, the detected electrostatic capacity is excessively influenced. As a result, the water content cannot be accurately measured. Therefore, the water condensation conditions causing a problem cannot be accurately detected. As a result, a problem of the type described above cannot be prevented.

As described above, the conventional device and method for detecting the interfacial components have been arranged to measure the components in the interfacial layer 10 by detecting the change in the electrostatic capacity. Therefore, a problem arises in that the interfacial components cannot be easily detected in a case where the electrostatic capacity is changed due to some other factor.

Figure 16:
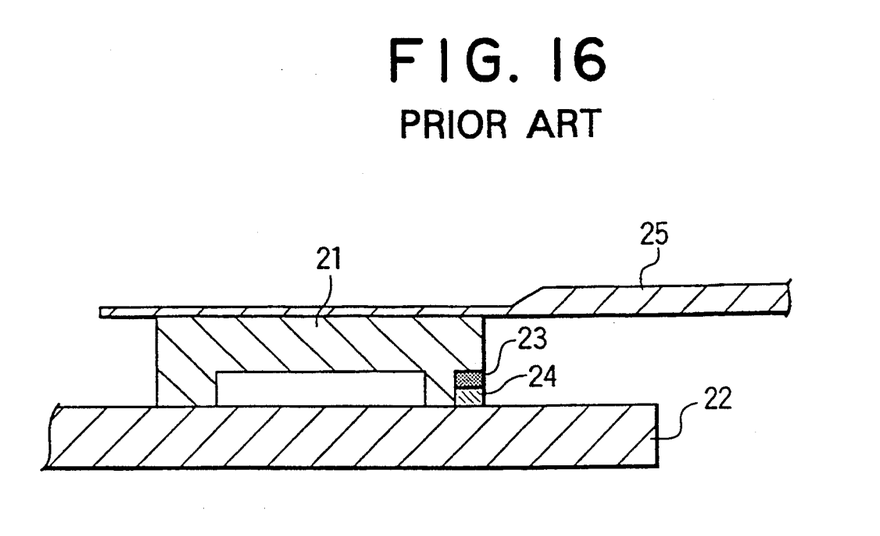
FIG. 16 is a schematic cross sectional view which illustrates a conventional interfacial component detection apparatus.

FIG. 16 is a schematic structural view which illustrates a conventional interfacial component detection apparatus, for example, a dew detection device for a magnetic disk disclosed in, for example, Japanese Patent Laid-Open No. 64-73581.

Referring to the drawing, a disk 22 is disposed to confront a slider 21 having a magnetic head (omitted from the illustration) therein. The slider 21 has, on its side confronting the disk 22, a first electrode 23, covered with an insulating film 24. The slider 21 is abutted against the surface of the disk 22 by a supporting body 25.

In the above-described structure, the disk 22 is conductive and serves as a second electrode confronting the slider 21. A detection terminal (omitted from the illustration) is connected to the disk 22 and the first electrode 23, respectively. A small space (interfacial layer) in which dew drops can easily be condensed is formed between the slider 21 and the disk 22.

Then, the operation of the conventional dew condensation detection device for a magnetic disk apparatus will be described. In this case, an assumption is made that the disk 22 is rotated about an axis perpendicular to the surface of the disk 22.

In a state before the start of the apparatus operation, the slider 21 is abutted to the disk 22 by the supporting body 25. Furthermore, the small interfacial layer exists between the insulating film 24 and the disk 22. When dew condensation takes place in this interfacial layer, the adhesive force between the slider 21 and the disk 22 is enlarged. Simultaneously, the electrostatic capacity between the insulating film 24 and the disk 22 is also enlarged.

Therefore, the electrostatic capacity between the first electrode 23 and the disk 22 is measured before the start of operation so as to detect water in the interfacial layer by detecting the change in the electrostatic capacity between the detection terminals. If an electrostatic capacity level equivalent to an adhesive force which is able to break the supporting body 25 is detected, rotation by a motor (omitted from the illustration) rotating the disk 25 is not started.

The above-described conventional dew condensation detection device for a magnetic disk apparatus has been arranged to measure the water in the interfacial layer by detecting the change in the electrostatic capacity. Therefore, a problem arises in that an accident due to water condensation cannot reliably be prevented since it is difficult to measure the quantity of water if the electrostatic capacity is influenced excessively.

Furthermore, since the disk 22 must serve as the second electrode, the structure cannot function when no electricity is supplied to the disk 22. What is even worse, the state of adhesion cannot be detected during operation.

SUMMARY OF THE INVENTION

Accordingly, an object of the present invention is to provide an interfacial component detection apparatus and method in such a manner that the components in an interfacial layer are directly detected with excellent accuracy, reproducibility and reliability.

Another object of the present invention is to provide a reliable interfacial component detection apparatus capable of detecting water in an interfacial layer regardless of the electricity supply to the disk and even if the apparatus is being operated.

According to one aspect of the present invention, there is provided an interfacial component detection apparatus comprising: a first solid portion; a plurality of electrodes spaced from one another on the first solid portion; a solid electrolytic layer formed on the first solid portion adjacent to an interfacial layer and covering the plurality of electrodes; and an I/O device for applying an electrical signal between at least two electrodes and detecting electrical signals from the electrodes.

According to another aspect of the present invention, there is provided an interfacial component detection apparatus comprising: a first solid portion; a first electrode formed on the first solid portion; a solid electrolytic layer on the first solid portion and covering the first electrode, the solid electrolytic layer contacting an interfacial layer which is the subject of detection; a second solid portion opposing the first solid portion with the interfacial layer therebetween; a second electrode on the second solid portion adjacent to the interfacial layer; and an I/O device for detecting electrical signals from the first and second electrodes.

According to another aspect of the present invention, there is provided an interfacial component detection apparatus comprising: a first solid portion; a first electrode on the first solid portion; a solid electrolytic layer on the first solid portion and covering the first electrode, the solid electrolytic layer being positioned in contact with an interfacial layer which is the subject of detection; a disk disposed to opposite the first solid portion with the interfacial layer therebetween and acting as a second electrode; and an I/O device for applying an electrical signal between the first electrode and the disk and detecting electrical signals.

According to another aspect of the present invention, there is provided an interfacial component detection method comprising applying electrical signals having different frequencies between at least two of a plurality of electrodes; and detecting components of an interfacial layer between the electrodes in accordance with the frequency dependency of the impedance between the electrodes.

According to another aspect of the present invention, there is provided an interfacial component detection method comprising applying an electrical signal of constant voltage or current between at least two of a plurality of electrodes so as to electrolyze the interfacial layer between the electrodes; and detecting components of the interfacial layer existing between the electrodes in accordance with current or voltage-time characteristics obtained by electrolysis.

DESCRIPTION OF THE PREFERRED EMBODIMENTS

Figure 1:
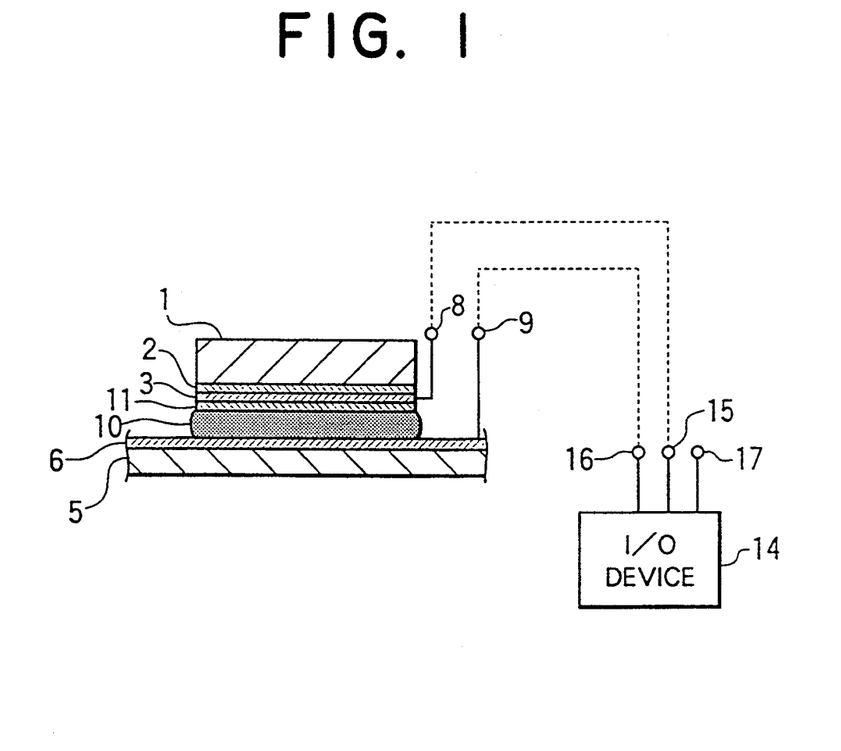
FIG. 1 is a schematic cross sectional view which illustrates an embodiment of an interfacial component detection apparatus according to the present invention.

Preferred embodiments of the present invention will now be described with reference to the drawings. FIG. 1 is a cross sectional view which illustrates an embodiment of the present invention, where reference numerals 1, 3, 5, 6 and 8 to 10 represent the same elements as those shown in FIG. 15.

A constant active layer 2 made of a hydrogen occluding alloy or a hydrogen ion conductive solid (for example, $KH_2PO_4$) on the first solid portion 1 is coupled to a first electrode 3. Furthermore, a solid electrolytic layer 11 made of a hydrogen ion conductive material is coupled to the first electrode 3 and covers it. The solid electrolytic layer 11 is made of antimony tetrahydroxide (V) ($Sb_2O_3.4H_2O$) or Nafion-117 manufactured by Dupont, the solid electrolytic layer 11 being positioned in contact with an interfacial layer 10 which is the subject of the detection.

As shown in the drawing, an I/O device 14 is provided for the purpose of detecting an electrical signal from each of the first and second electrodes 3 and 6 via detection electrodes 8 and 9. The I/O device 14 includes a first I/O terminal 15 connected to the first detection terminal 8, a second I/O terminal 16 connected to the second detection terminal 9 and an I/O terminal 17 connected to an external reference electrode (omitted from the illustration).

Then, the operation of the embodiment of the present invention shown in FIG. 1 will be described with reference to a case in which the interfacial layer 10 is composed of water.

First, a case will be described in which the components in the interface are detected by using impedance characteristics of the interfacial layer 10. In this case, the first and second I/O terminals 15 and 16 of the I/O device 14 are connected to the corresponding first and second detection terminals 8 and 9 so as to apply an electrical signal having a predetermined frequency between the detection terminals 8 and 9. Then, the impedance characteristic between the first and second electrodes 3 and 6 is measured by changing the frequency of the electrical signal.

Figure 2A:
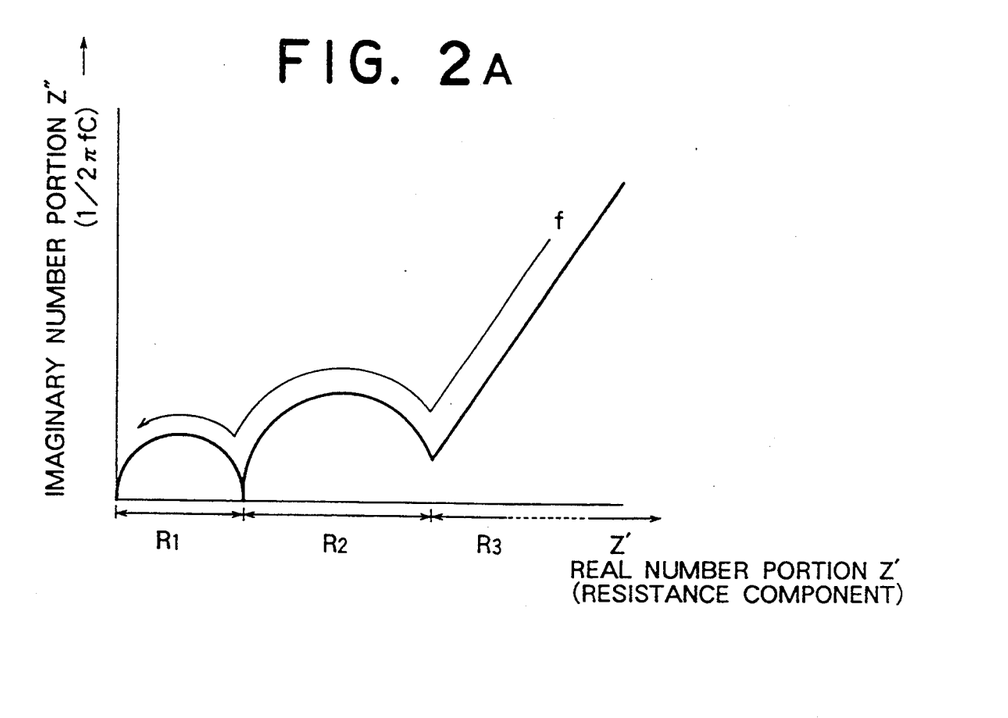
FIG. 2A is a graph which illustrates impedance characteristics for describing the operation of the apparatus shown in FIG. 1.

FIG. 2A is a drawing which illustrates, with complex impedance plots, the impedance characteristics between the electrodes 3 and 6. Referring to the drawing, abscissa Z' stands for the real number portion (corresponding to resistance component R) of impedance Z while ordinate Z'' stands for the imaginary number i.e., phase portion ($1/\omega C$) of the impedance Z, where C [Farads] represents the electrostatic capacitance between the electrodes 3 and 6 and $\omega$ represents the angular frequency of the electrical signal, the angular frequency $\omega$ having the following relationship with frequency f [Hz]:

$$\omega = 2\pi f$$

Figure 2B:
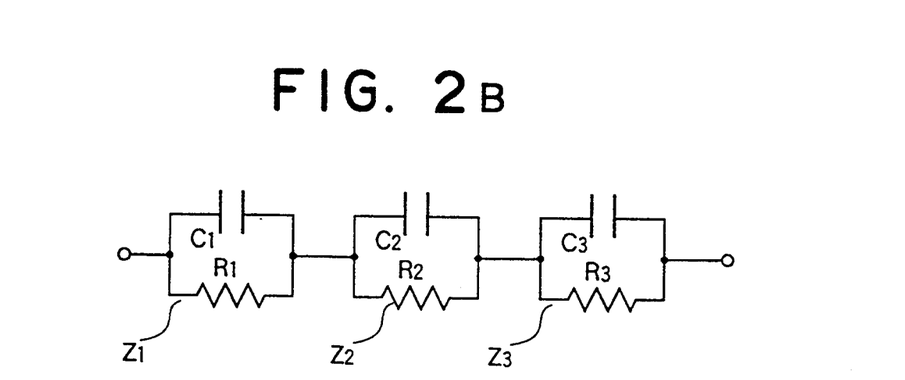
FIG. 2B is a circuit diagram of the apparatus shown in FIG. 1.

As shown in FIG. 2B, the impedance Z between the electrodes can also be expressed by an equivalent circuit composed of series circuits of impedances $Z_1$ to $Z_3$, where $Z_1$ denotes the impedance of the interfacial layer 10 and the solid electrolytic layer 11, $Z_2$ denotes the impedance of the first and second electrodes 3 and 6, and $Z_3$ denotes the impedance of a moving substance (for example, hydrogen ions). The above-described impedances are respectively constituted by respective parallel circuits of corresponding electrostatic capacitance components $C_1$ to $C_3$ and resistance components $R_1$ to $R_3$.

If the frequency f of the electrical signal is raised excessively, the characteristics curve is, as shown by an arrow in the drawing, changed. For example, the frequency f is Changed in a range between several tens of Hz and several hundreds of kHz and, inflection points appear in the complex impedance plots. The real number axial components $R_1$, $R_2$ and $R_3$, which correspond to the inflection points, correspond to the resistance components $R_1$ to $R_3$ in the impedances $Z_1$ to $Z_3$, while the values of the imaginary number axial component Z'' correspond to the electrostatic capacitances $C_1$ to $C_3$ ($\frac{1}{2}\pi fC$).

Since the resistance component $R_1$ corresponds to the thickness of the water layer in the interfacial layer 10, the thickness of the interfacial layer 10 can be obtained by determining the real number axial component $R_1$ from the impedance characteristics.

In the above-described case where the components of the interfacial layer 10 are detected in accordance with the frequency dependency of the impedance Z between the electrodes, the constant active layer 2 can be omitted from the structure.

Figure 3:
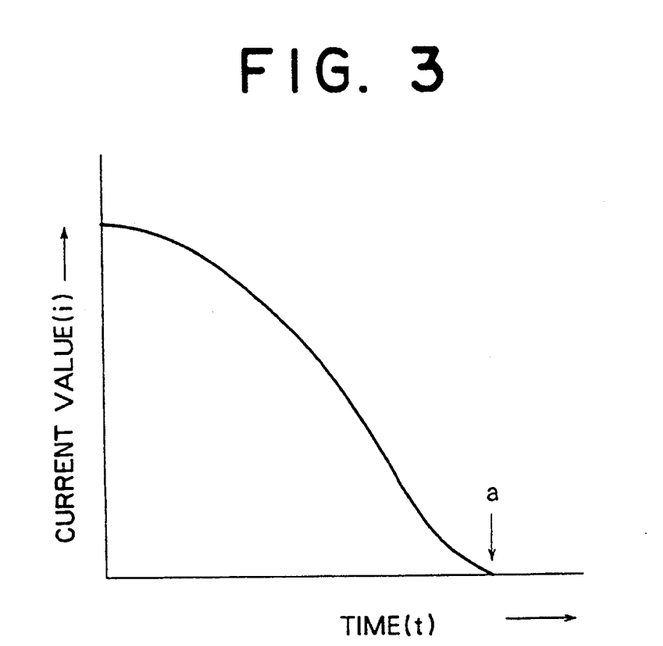
FIG. 3 is a graph which illustrates the relationship between electric current and time for describing the operation of the apparatus shown in FIG. 1.

Then, a description will be made of a case in which the components of the interface are detected in accordance with the relationship between electric current and time determined by carrying out electrolysis by applying a constant voltage to the electrodes.

In this case, the detection terminals 8 and 9 are, as described above, connected to the corresponding I/O terminals 15 and 16. Furthermore, the I/O device 14 is used as a constant-potential electrolysis device.

In order to make the first electrode 3 a cathode and the second electrode 6 an anode, a voltage exceeding 1.23 V, which is the electrolysis voltage for water, is constantly applied between the first and second electrodes 3 and 6.

In the case where water exists in the interfacial layer 10, the electrolysis of water proceeds until a reaction expressed as follows takes place in the first electrode 3:

$$2H^+ + 2e^- \rightarrow H_2$$

On the other hand, a reaction expressed as follows takes place in the second electrode 6:

$$H_2O \rightarrow 2H^+ + \tfrac{1}{2}O_2 + 2e^-$$

The hydrogen $H_2$ generated in the first electrode 3 is occluded in the hydrogen occluding alloy of the constant active layer 2.

In the electrolysis, the electric current value i between the electrodes 3 and 6 decreases as time t proceeds until it becomes 0 at point a. At this point, the electrolysis is completed.

Figure 4:
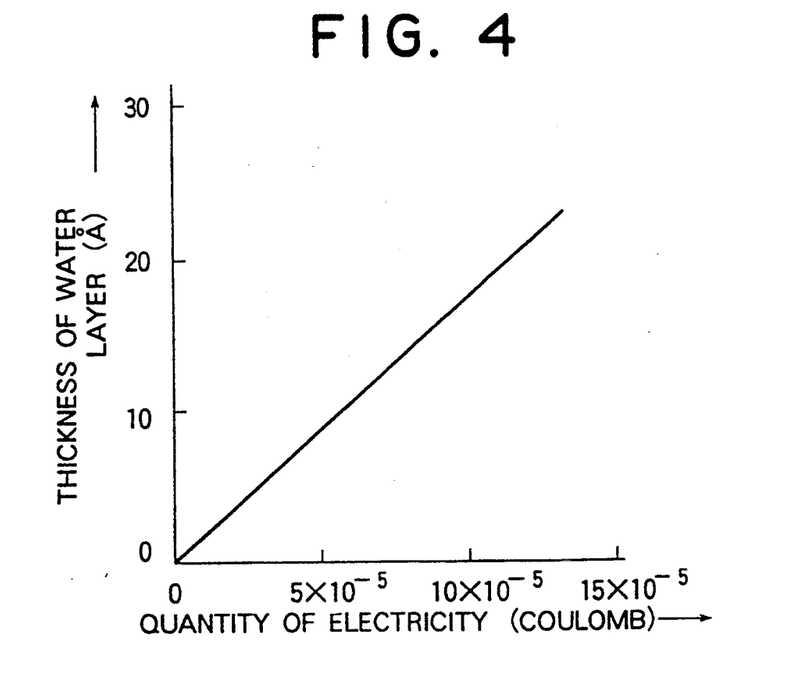
FIG. 4 is a graph which illustrates the relationship between the thickness of a water layer and the quantity of electricity necessary for electrolysis.

In this case, the quantity of water in the interfacial layer 10 can be detected by integrating the electric current i with respect to time t so as to obtain the supplied quantity of electricity. The quantity of electricity necessary to electrolyze 1M of water is 2 [Faradays] (193000 [coulombs]). In this case, since the electric quantity and the water layer thickness [A] have a linear relationship, the quantity of water can be determined.

Figure 5:
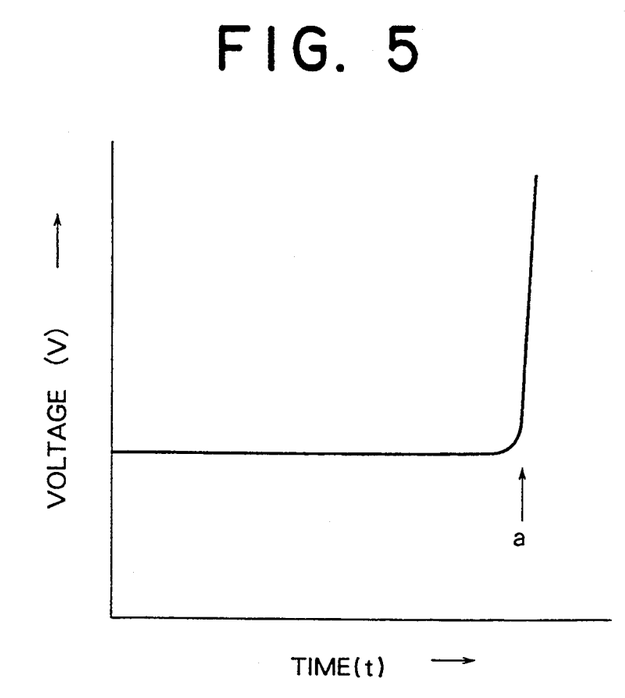
FIG. 5 is a graph which illustrates the relationship between voltage and time for describing the operation of the apparatus shown in FIG. 1.

Then, a description will be made of the case where the components in the interface are detected from the relationship between voltage and time obtained by electrolysis of water in supplying a predetermined electric current.

Also in this case, the detection terminals 8 and 9 are connected as in the I/O terminals 15 and 16 to the above-described cases. Furthermore, the I/O device 14 is used as a constant electric current electrolysis device.

In this case, since a predetermined electric current (several μA to several mA) is supplied and the same electrolysis reactions take place at the electrodes 3 and 6, the voltage V between the detection terminals 8 and 9 is as shown in FIG. 5. That is, the voltage V is substantially constant with respect to time t during the period in which water exists in the interfacial layer 10. The voltage rapidly increases at the time (point a) when water disappears due to the completion of the electrolysis.

Therefore, the quantity of water in the interfacial layer 10 can be determined from the characteristics shown in FIG. 4 of the supplied quantity of electricity obtained from the product of the power supply time to the point a and the supplied current by utilizing the fact that the quantity of electricity necessary to electrolyze 1M of water is 2 [faradays].

Then, a description will be made of the case where the components in the interface are detected in accordance with the voltage between the electrodes 3 and 6 while the detection device shown in FIG. 1 function as a battery.

In this case, the dissolved oxygen contained in the water of the interfacial layer 10 is detected while assuming that the hydrogen activity of the constant active layer 2 is constant.

In this case, the first electrode 3 is a conductor of hydrogen ions and electrons, Furthermore, the I/O device 14 is used as a voltage detection device. The first and second detection terminals 8 and 9 are connected to the first and second I/O terminals 15 and 16 as in the above-described cases. The third I/O terminal 17 is connected to an external reference electrode.

Figure 6:
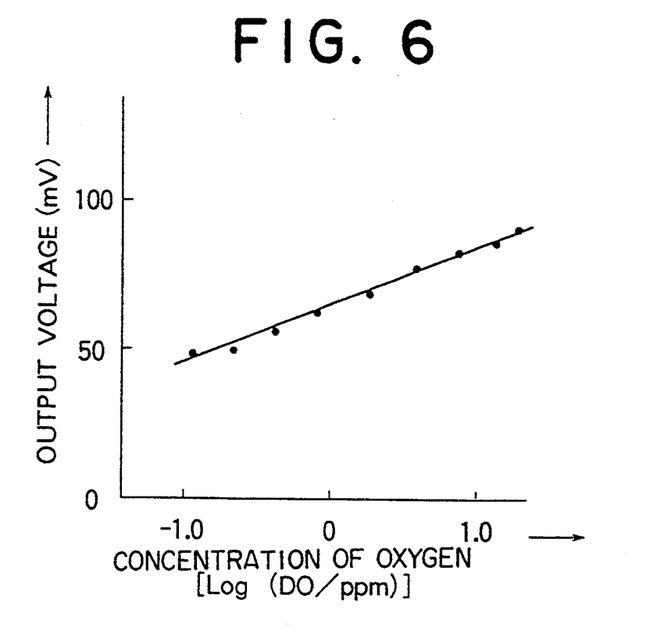
FIG. 6 is a graph which illustrates the relationship between output voltage and the concentration of oxygen for describing the operation of the apparatus shown in FIG. 1.

As shown in FIG. 6, the output voltage [mV] detected between the detection terminals 8 and 9 linearly changes with respect to the logarithm of the oxygen [DO/ppm] dissolved in the interfacial layer 10. Therefore, the oxygen dissolved in the interfacial layer 10 can be determined by detecting the output voltage between the electrodes 3 and 6.

Figure 7:
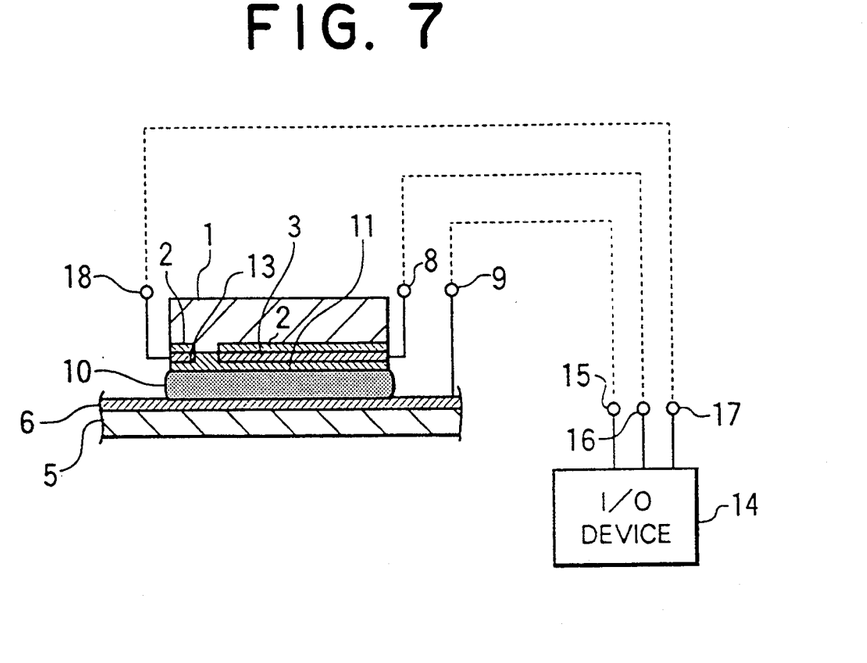
FIG. 7 is a schematic cross sectional view which illustrates another embodiment of the interfacial component detection apparatus according to the present invention.

Although only the first electrode 3 is on the first solid portion 1 according to the above-described embodiment, another structure as shown in FIG. 7 may be employed in which a third electrode 13 is provided separate from the first electrode 3.

Referring to FIG. 7, a third detection terminal 18 is provided for the third electrode 13, the third detection terminal 18 being connected to the third I/O terminal 17 of the I/O device 14. Although the constant active layer 2 is coupled to both the first and third electrodes 3 and 13, it need only be connected to at least one of the above-described two electrodes.

Similarly to the above-described cases, the components in the interface can be detected in accordance with the impedance characteristics between the electrodes, the current-time characteristics obtained by constant voltage electrolysis, the voltage-time characteristics obtained by constant current electrolysis, or the output voltage characteristics.

In the case shown in FIG. 7, the actual quantity of electricity consumed to complete electrolysis can be obtained by subjecting the response characteristic of the current passing between the first and second electrodes 3 and 6 to a comparison between the time before and after the electrolysis of the water layer in the interfacial layer 10, the response characteristics being the characteristics displayed when the potential difference between the first and third electrodes 3 and 13 is regularly changed.

Figure 8:
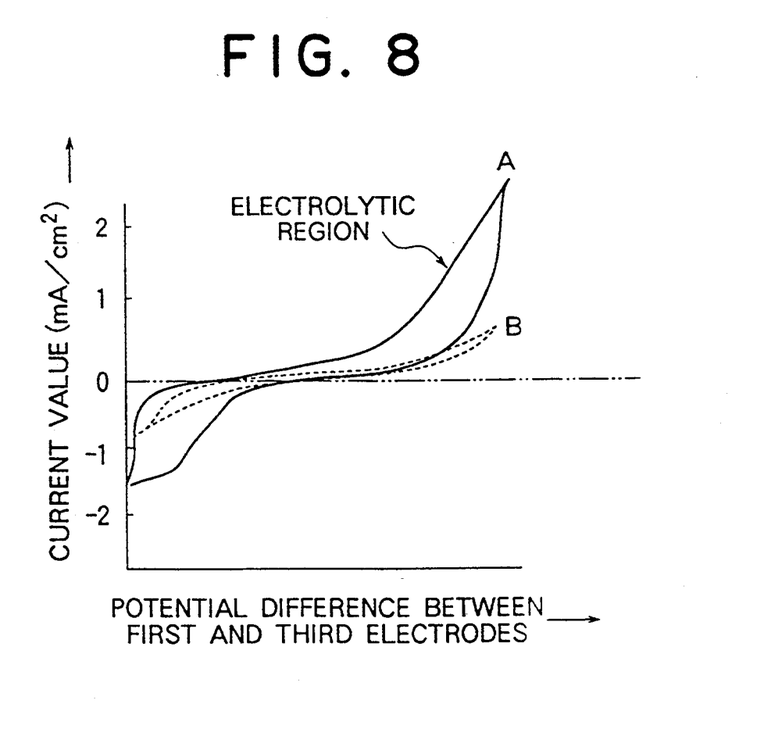
FIG. 8 is a graph which illustrates the relationship between current between the first and second electrodes and potential difference between the first and third electrodes.

The relationship between the potential difference between the first and third electrodes 3 and 13 and the electric current passing between the first and second electrodes 3 and 6 is as shown in FIG. 8 when the potential difference between the first and third electrodes 3 and 13 is regularly changed. Referring to FIG. 8, the abscissa stands for the voltage with respect to a normal hydrogen electrode, while the ordinate stands for the electric current value. Hysteresis curve A expressed by a solid line designates the response characteristics of the current-potential before electrolysis, while hysteresis curve B expressed by a dashed line stands for the same after electrolysis.

In this case, the quantity of water can be calculated from the quantity of electricity in the areas of the electrolyzed portions displaying a current value exceeding 0 [mA]. Another structure may be employed which is arranged in such a manner that an electrode (omitted from the illustration) structured similarly to the third electrode 13 is further disposed on the solid electrolytic layer 11 and the thus disposed electrode is, as a reference electrode, connected to a fourth I/O terminal (omitted from the illustration) of the I/O device 14. As a result, at least one of electrochemical reactions taking place on the first and third electrodes 3 and 13 can be controlled. Therefore, the detected components can be qualitatively and quantitatively analyzed.

Then, a description will be given of a case where the second electrode 6 is omitted from the structure shown in FIG. 7, that is, a case where the components in the interface are detected by using only the elements adjacent to the first solid portion 1.

In the case where the I/O device 14 is used as a constant current power supply, the detection terminals 8 and 18 of the first and third electrodes 3 and 13 are respectively connected to the first and third I/O terminals 15 and 17. According to this case, the first electrode 3 is made of palladium, while the third electrode 13 is made of a porous platinum film.

In order to make the first electrode 3 a cathode and the third electrode 13 an anode, a DC current is supplied through the I/O device 14. As a result, the water in the interfacial layer 10 is absorbed by the solid electrolytic layer 11, the thus absorbed water being then removed due to electrolysis. At this time, a reaction expressed as follows takes place at the third electrode 13:

$$H_2O \rightarrow 2H^+ + \tfrac{1}{2}O_2 + 2e^-$$

As a result, generated oxygen $O_2$ is transmitted through the solid electrolytic layer 11 so as to be diffused and discharged outside the system.

On the other hand, hydrogen ions $H^+$ are moved in the solid electrolytic layer 11 from the third electrode 13 toward the first electrode 3 before becoming hydrogen gas $H_2$ as a result of a reaction expressed as follows and taking place in the first electrode 3:

$$2H^+ + 2e^- \rightarrow H_2$$

The thus generated hydrogen gas is transmitted through the solid electrolytic layer 11 so as to be diffused and discharged outside the system.

The above-described constant current electrolysis is continued as long as water exists in the interfacial layer 10. If water disappears, the electric resistance of the solid electrolytic layer 11 is enlarged, causing the voltage between the first and third electrodes 3 and 13 to be raised as designated by point a of FIG. 5. Therefore, the quantity of water in the interfacial layer 10 can be calculated from the supplied quantity of electricity obtained from the product of the elapsed time to point a and the current value.

The above-described method of detecting the components in the interface can be applied to a case in which water is detected while the head is moving and spaced from the disk surface. That is, when the first and second solid portions 1 and 5 are spaced from each other, the first solid portion 1 is able to act as a dew condensation sensor as well as an interfacial component detector. Although a conventional dew condensation sensor determines the occurrence of dew condensation, the structure thus constituted is able to detect the quantity of condensed dew.

If the I/O device 14 is connected in such a manner that the impedance Z between the first and third electrodes 3 and 13 can be measured, complex impedance plots similar to that shown in FIG. 2 are obtained. Therefore, a structure of this type can be used as a dew condensation sensor.

The Nafion film forming the solid electrolytic layer 11 contains water which is capable of equilibrating with the water vapor pressure in air and has a resistance corresponding to the water content. That is, the humidity of the environment in which the first solid portion 1 is placed can be detected by obtaining the resistance of the solid electrolytic layer 11 from the complex impedance plots.

When the first and third electrodes 3 and 13 are used as described above, the components of the interfacial layer 10 between the first and second solid portions 1 and 5 can be detected. Furthermore, this structure is able to act as a humidity sensor and to determine the quantity of the detected components.

Then, a description will be made of a case in which components other than water in the interface are detected by properly combining the materials of the constant active layer 2, the electrodes 3, 6 and 13, and the solid electrolytic layer 11.

An assumption is made that the first electrode 3 is made of silver (Ag) and the quantity of it is previously known. Furthermore, it is assumed that the solid electrolytic layer 11 is made of a silver ion conductive solid (for example, $Ag_3SI$), chloride ion ($Cl^-$) exists in the interfacial layer 10 and the second electrode 6 is a platinum film.

In this case, when the I/O device 14 is used as a constant current power supply and power is supplied so as to make the first electrode 3 an anode and the second electrode 6 a cathode, the silver ion $Ag^+$ moves in the direction in which the electricity is supplied. The silver ion $Ag^+$ reacts with the chloride ion $Cl^-$ existing in the interfacial layer 10 at the interface between the interfacial layer 10 and the solid electrolytic layer 11 so that a silver chloride (AgCl) layer is formed. At this time, in regions in which the quantity of the chloride ion $Cl^-$ is small, an AgCl layer having a large resistance corresponding to the quantity of the chloride ion $Cl^-$ is formed.

Therefore, the quantity of the AgCl layer can be detected by measuring the time sequential increase in the resistance between the first and second electrodes 3 and 6. Therefore, the quantity of the AgCl layer, that is, the quantity of chloride ion $Cl^-$ can be calculated by converting the supplied quantity of electricity into its chemical equivalent.

Another structure may be employed in which a proper material for the solid electrolytic layer 11 is selected from a group consisting of an Na ion conductive solid, an Li ion conductive solid, a Cu ion conductive solid, an $F^-$ ion conductive solid and, an $OH^-$ ion conductive solid. Furthermore, the electrodes are properly connected to the I/O device 14. In this case, the interfacial components which are able to chemically react with the solid electrolytic layer 11 can be detected.

According to the above-described embodiment, a structure is described in which an interfacial component is detected by providing a single solid electrolytic layer 11 on the first solid portion 1. However, another structure as shown in FIG. 9 may be employed in which two or more types of solid electrolytic layers are provided and a plurality of electrodes are provided to correspond to the number of the solid electrolytic layers so as to simultaneously detect a plurality of interfacial components (corrosive components).

Figure 9:
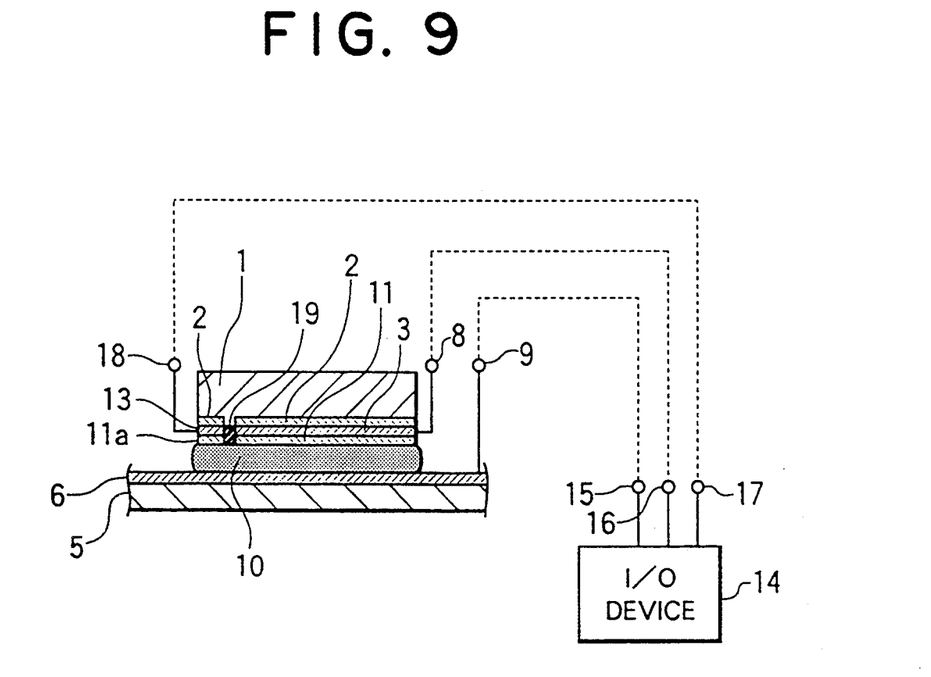
FIG. 9 is a schematic cross sectional view which illustrates another embodiment of the interfacial component detection apparatus according to the present invention.

Referring to FIG. 9, another solid electrolytic layer 11a is formed separately from the solid electrolytic layer 11 and an insulating layer 19 is interposed between the solid electrolytic layers 11 and 11a.

According to this example, the element represented by reference numeral 11 is called a first solid electrolytic layer and that represented by 11a is called a second solid electrolytic layer. Furthermore, the first solid electrolytic layer 11 is made of $Ag_3SI$, which is a silver ion conductive solid, and the second solid electrolytic layer 11a is made of Nafion 117 (manufactured by Du- pont) which is a hydrogen ion conductive solid. The constant active layer 2 is made of $KH_2PO_4$ having a predetermined hydrogen activity, the first electrode 3 is made of palladium, the second electrode 6 is a conductive-carbon protection film, the third electrode 13 is made of silver and the interfacial layer 10 is composed of water containing chloride ion and dissolved oxygen.

First, a method of detecting the dissolved oxygen contained in the interfacial layer 10 will be described.

As shown in FIG. 6, the output voltage generated between the first and second electrodes 3 and 6 is in proportion to the logarithm of the density of oxygen dissolved tn the interfacial layer 10. Therefore, the quantity of oxygen can be detected from the density of dissolved oxygen and the output voltage characteristics.

Then, a method of detecting the chloride ion contained in the interfacial layer 10 will be described.

In this case, a DC voltage is applied so as to make the third electrode 13 on which silver of a known quantity is formed an anode and the second electrode 6 a cathode. At this time, a reaction expressed as follows takes place at the interface between the first solid electrolytic layer 11 and the interfacial layer 10:

$$Ag^+ + Cl^- \rightarrow AgCl$$

As a result, an AgCl layer displaying a relatively large electric resistance is formed. Therefore, the chloride ion $Cl^-$ can be detected by measuring the time sequential change in the resistance between the third and second electrodes 13 and 6.

As described above, two types of the corrosive components (for example, $Cl^-$) contained in the interfacial layer 10 can be detected by using one detection device. Therefore, problems such as the adhesion of the head and the disk of the magnetic disk apparatus due to the influence of the interfacial layer 10 can be overcome. Furthermore, an information can be obtained so that the corrosive factor on the surface of the disk can be determined.

Three or more components can, of course, be simultaneously detected by increasing the number of the solid electrolytic layers on the first solid portion 1.

Figure 10:
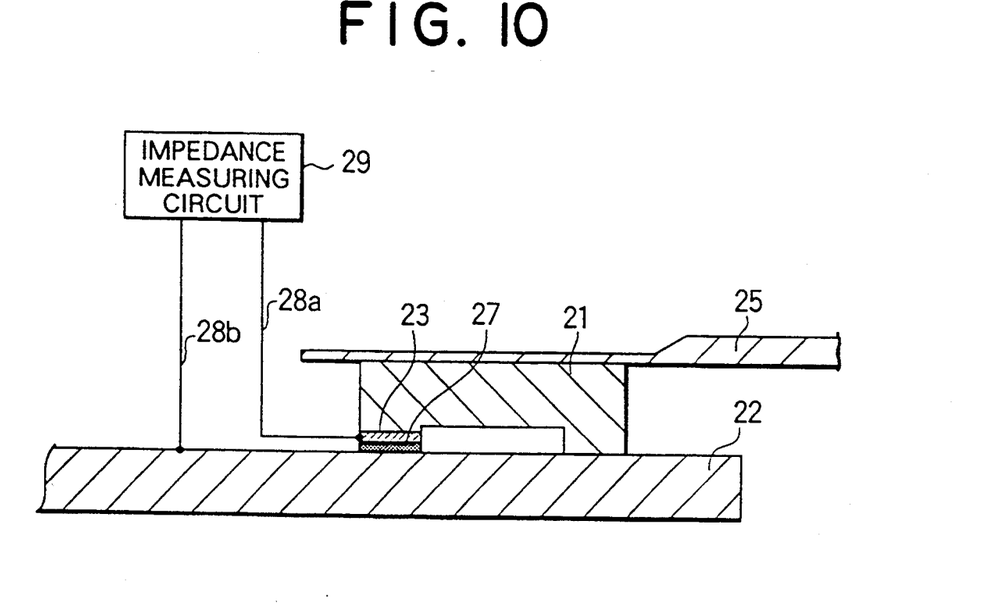
FIG. 10 is a schematic cross sectional view which illustrates another embodiment of the interfacial component detection apparatus according to the present invention.

FIG. 10 is a schematic structural view which illustrates another embodiment of the interfacial component detection apparatus according to the present invention. The elements given the reference numerals 21 to 23 and 25 are the same as those according to the structure shown in FIG. 16.

In the structure shown in FIG. 10, the slider 21 is made of $Al_2O_3TiC$, which is a conductive material and the disk 22 is made of a sputtered medium which also is a conductive material. The first electrode 23 is made of palladium which is stable against water and is evaporated on to the surface of the slider 21.

A hydrogen ion conductive film 27 made of, for example, Nafion is formed on the surface of the first electrode 23 in such a manner that it is able to come in contact with the second electrode, that is, the disk 22.

A lead wire 28a is connected to the first electrode 23, while another lead wire 28b is connected to the disk 22. Furthermore, an impedance measuring circuit 29 is provided for the purpose of measuring the frequency characteristics of the impedance $Z_4$ between the first electrode 3 and the second electrode, that is, the disk 22 in response to an electrical signal supplied through the lead wires 28a and 28b.

Then, the operation of the apparatus for detecting the interfacial components shown in FIG. 10 will be described with reference to FIGS. 11 to 13.

At the start of apparatus operation, the slider 21 is abutted against the disk 22 by a supporting body 25. If water exists in a small space at the interface between the hydrogen ion conductive film 27 and the disk 22, the resistance $R_4$ [$\Omega$] of the hydrogen ion conductive film 27 will change in accordance with the quantity of water. In order to detect the change in the resistance $R_4$ of the hydrogen ion conductive film 27, the impedance measuring circuit 29 applies an electrical signal having a predetermined frequency between the lead wires 28a and 28b. Then, the frequency characteristics of the impedance $Z_4$ between the first electrode 23 and the disk 22 (the second electrode) are measured while successively changing the frequency of the electrical signal.

Figure 11:
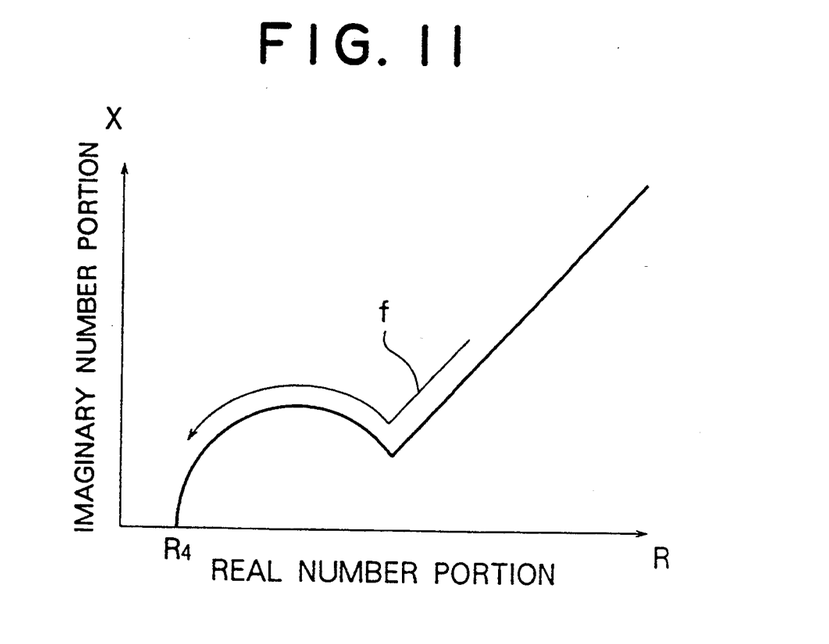
FIG. 11 is a graph which illustrates the relationship between impedance between the first and second electrodes and frequency.

FIG. 11 is a drawing which illustrates the frequency characteristics of the impedance $Z_4$ between the first electrode 23 and the disk 22 when the frequency of the electrical signal is changed, the frequency characteristics being expressed by complex impedance plots.

Referring to the drawing, the abscissa R stands for the real number portion (corresponding to the resistance component) of the impedance $Z_4$ and the ordinate X denotes the imaginary number portion ($1/\omega C$) of the impedance $Z_4$, where symbol C denotes the electrostatic capacity between the first electrode 23 and the disk 22 and $\omega$ denotes the angular frequency ($=2\pi f$) of the electrical signal.

The impedance $Z_4$ can be expressed by the sum of the resistance $R_4$ of the hydrogen ion conductive film 27 and the impedance $Z_5$ of the interfacial layer. If the frequency f of the electrical signal increases infinitely, the imaginary number portion X ($=1/\omega C$) becomes zero, causing the impedance $Z_5$ including the imaginary number portion X to become zero. Therefore, it can be understood that the real number portion R of the impedance $Z_4$ denotes the resistance $R_4$ of the hydrogen ion conductive film 27. Therefore, the impedance measuring circuit 29 is able to obtain the resistance $R_4$ when $f=\infty$ applies in accordance with the frequency characteristics of the impedance $Z_4$.

Figure 12:
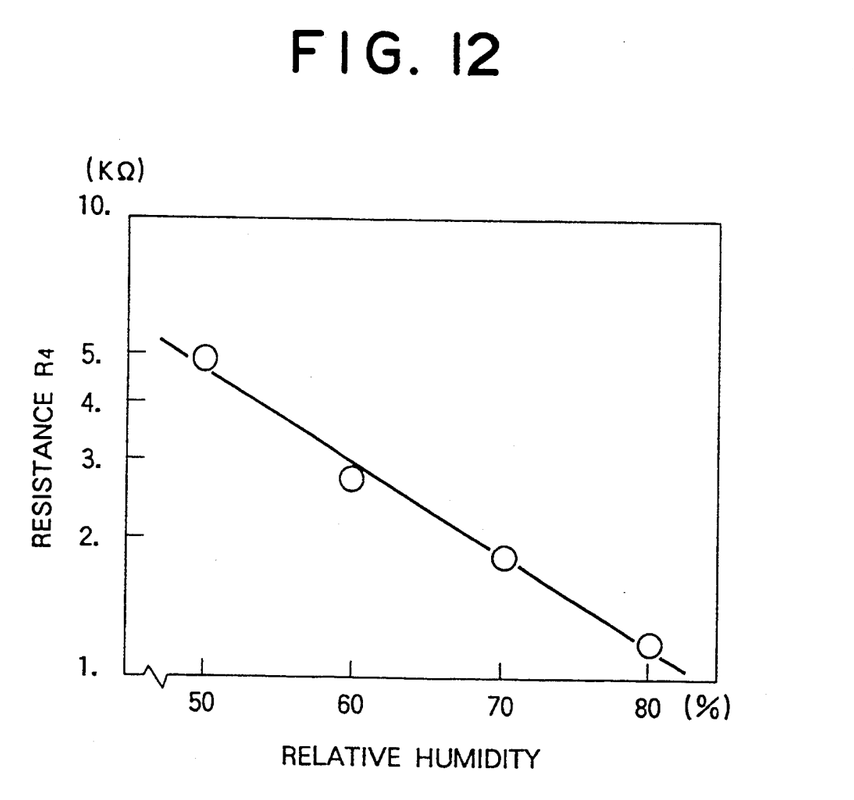
FIG. 12 is a graph which illustrates the relationship between the resistance of a hydrogen ion conductive film and relative humidity.
Figure 13:
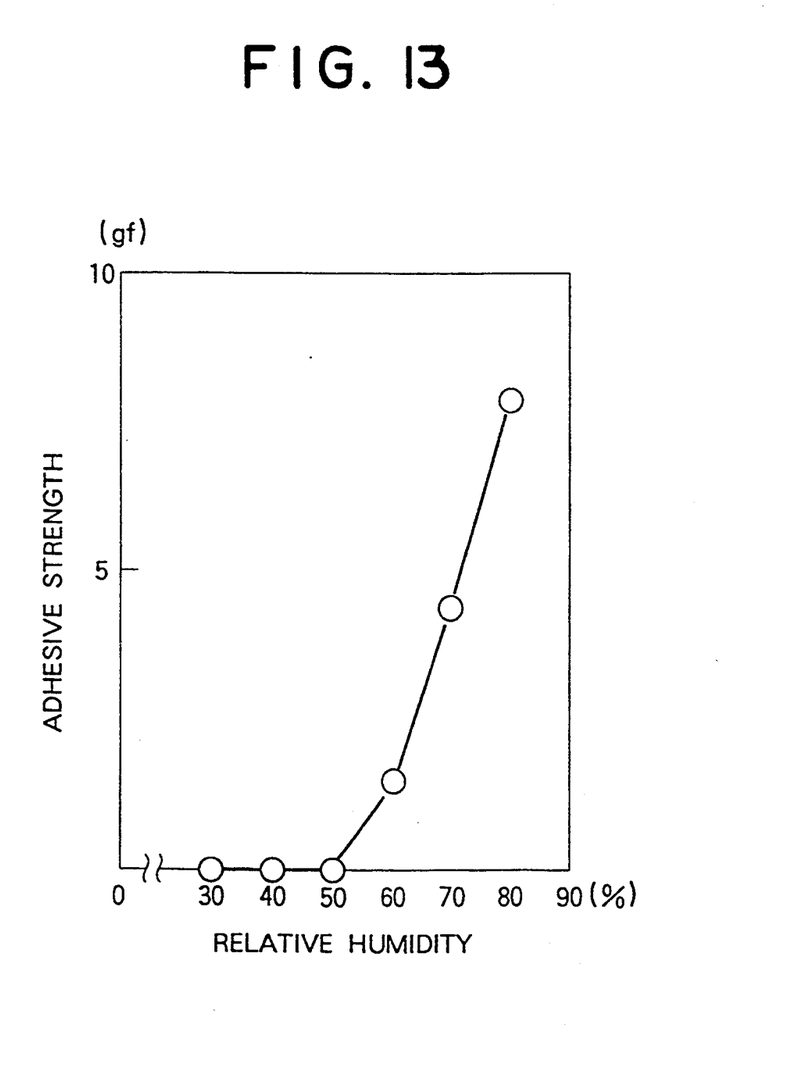
FIG. 13 is a graph which illustrates the relationship between relative humidity and adhesive force.

FIG. 12 illustrates the relationship between the resistance $R_4$ of the hydrogen ion conductive film 27 and relative humidity [%]. FIG. 13 is a drawing which illustrates the relationship between the relative humidity and the adhesive strength [gf]. It can be understood that, if the resistance $R_4$ of the hydrogen ion conductive film 27 can be detected from FIGS. 12 and 13, the relative humidity can be obtained. Then, the adhesive force can be obtained from the relative humidity.

Therefore, the impedance measuring circuit 29 acts to prevent the rotation of the motor for rotating the disk 22 when the resistance value $R_4$ is a level at which an accident due to the adhesion can take place in the magnetic disk apparatus.

According to the above-described embodiment, the hydrogen ion conductive film 27 is formed on the first electrode 23 adjacent to the slider 21 but, a similar effect can be obtained when the film 27 is formed on the portion adjacent to the disk 22 (the second electrode).

Furthermore, although the slider 21 is made of a conductor, it may be made of an insulating material.

In addition, the structure in which the disk 22 is made of a conductor so as to make the disk a second electrode may be replaced by another structure in which the disk 22 is made of an insulating material and a second electrode (omitted from the illustration) is formed on the surface of the disk 22 adjacent to the slider 21.

According to the above-made description, only the first electrode 23 is provided on the slider 21. However, the first electrode 23 may be composed of a plurality of electrodes which are insulated from one another.

Figure 14:
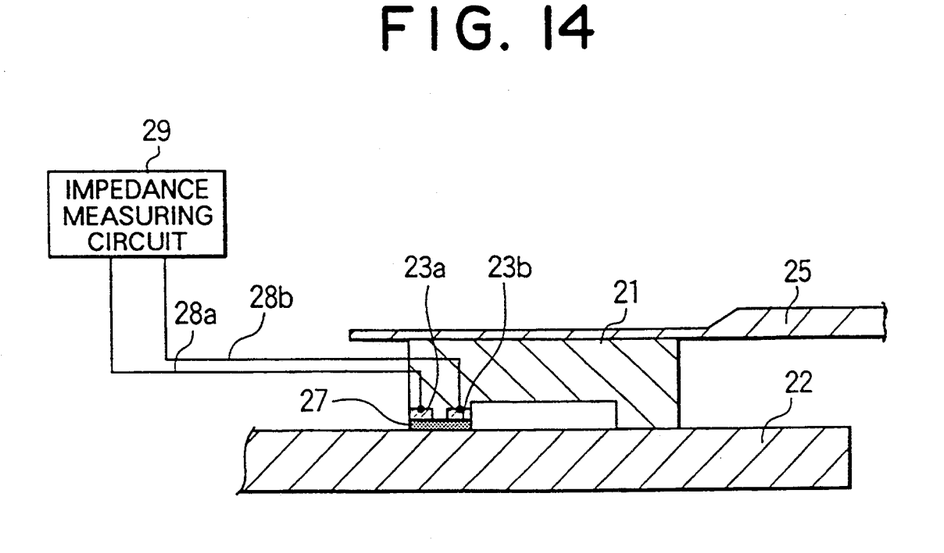
FIG. 14 is a schematic cross sectional view which illustrates another embodiment of the interfacial component detection apparatus according to the present invention.

Then, a description will be given another embodiment arranged in such a manner that a plurality of electrodes are formed in a portion adjacent to the slider.

FIG. 14 is a schematic cross sectional view which illustrates another embodiment of the interfacial component detection apparatus. Referring to the drawing, a plurality of electrodes 23a and 23b are formed on the surface of the slider 21 in such a manner that they are insulated from each other.

In this case, the slider 21 is made of, for example, $TiO_2 \cdot CaO$. Furthermore, the plurality of electrodes 23a and 23b are formed by evaporating palladium in such a manner that the electrodes are not short-circuited, In addition, the hydrogen ion conductive film 27 covers the surface of each of the electrodes 23a and 23b so that it can be connected to the plurality of electrodes 23a and 23b. Furthermore, the lead wires 28a and 28b connected to the impedance measuring circuit 29 are respectively connected to the electrodes 23a and 23b.

In a case where the state of dew condensation in the interfacial layer on the disk is detected using the apparatus shown in FIG. 14, the slider 21 is abutted against the disk 22 by the supporting body 25 before the operation of the apparatus is started so as to quantitatively determine the amount of water. Therefore, if water in a quantity which will cause an adhesive force exceeding an allowable limit is detected, the apparatus is not started.

On the other hand, the hydrogen ion conductive film 27 positioned in contact with the two electrodes 23a and 23b is always exposed to the interfacial layer even if the apparatus is being operated with the slider 21 floating above the disk 22. Therefore, the quantity of evaporated water on the disk 22 can be measured and the state of dew condensation in the interfacial layer can thereby be detected. As a result, if water in a quantity which will cause an adhesive force exceeding an allowable limit is detected, the operation of the apparatus is immediately stopped so as to prevent an accident due to adhesion.

As detection is performed in the slider 21, dew condensation can be reliably detected regardless of the fact that the disk 22 is made of a conductor.

According to the above-described embodiment, the slider 21 is made of an insulating material. However, it may be made of a conductor such as $Al_2O_3 \cdot TiC$. In this case, an insulating film made of, for example, $SiO_2$ must be formed on the surface of the slider 21 on which the plurality of electrodes 23a and 23b and the hydrogen ion conductive film 27 are formed.

Although a description was made of a structure with the two electrodes 23a and 23b as the "plurality of electrodes", three or more electrodes may be used. In this case, the hydrogen ion conductive film 27 must be formed in such a manner that it can be connected to at least two electrodes.

What is claimed is:

1. An interfacial component detection apparatus comprising:
    a first solid portion;
    a second solid portion disposed in proximity to and supported for movement relative to the first solid portion and separated from the first solid portion by an interfacial layer;
    first and second electrodes disposed on the first solid portion opposite the second solid portion and spaced apart from one another;
    a solid electrolytic layer disposed on the first and second electrodes between the electrodes and the interfacial layer; and
    sensing means electrically connected to the first and second electrodes for applying an electrical signal across the first and second electrodes and for detecting electrical signals from said electrodes, thereby sensing a component of the interfacial layer.

2. An interfacial component detection apparatus according to claim 1 wherein the solid electrolytic layer comprises a first portion disposed on the first electrode and a second portion formed on the second electrode and electrically insulated from the first portion.

3. An interfacial component detection apparatus according to claim 1 wherein the solid electrolytic layer is a hydrogen ion conductive solid.

4. An interfacial component detection apparatus according to claim 1 comprising a constant active layer disposed between the first solid portion and the first and second electrodes.

5. An interfacial component detection apparatus according to claim 4 wherein the constant active layer is a hydrogen occluding alloy.

6. An interfacial component detection apparatus according to claim 4 wherein the constant active layer is a hydrogen ion conductive solid.

7. An interfacial component detection apparatus comprising:
    a first solid portion;
    an electrically conducting member disposed in proximity to and supported for movement relative to the first solid portion and separated from the first solid portion by an interfacial layer;
    a first electrode disposed on the first solid portion opposite the electrically conducting member;
    a solid electrolytic layer disposed on the first electrode between the first electrode and the interfacial layer; and
    sensing means electrically connected to the first electrode and the electrically conducting member for sensing an electrical signal across the first electrode and the electrically conducting member and thereby sensing a component of the interfacial layer.

8. An interfacial component detection apparatus according to claim 7 wherein the first solid portion is a slider having a magnetic head opposing the electrically conducting member.

9. An interfacial component detection apparatus according to claim 7 wherein the solid electrolytic layer is a hydrogen ion conductive solid.

10. An interfacial component detection apparatus according to claim 7 comprising a constant active layer disposed between the first solid portion and the first electrode.

11. An interfacial component detection apparatus according to claim 10 wherein the constant active layer is a hydrogen occluding alloy.

12. An interfacial component detection apparatus according to claim 10 wherein the constant active layer is a hydrogen ion conductive solid.

13. An interfacial component detection apparatus according to claim 1 wherein the sensing means comprises means for applying a signal of varying frequency across the electrodes and for sensing impedance between the electrodes as the frequency of the signal is varied.

14. An interfacial component detection apparatus according to claim 1 wherein the sensing means comprises means for applying a constant voltage signal across the electrodes and for measuring electrical current flowing between the electrodes until the current decreases to zero.

15. An interfacial component detection apparatus according to claim 1 wherein the sensing means comprises means for applying a signal to establish a constant current flow between the electrodes and for measuring total electrical charge flow between the electrodes while a constant voltage is applied across the electrodes.

16. An interfacial component detection apparatus according to claim 1 wherein the sensing means comprises means for sensing a signal generated across the electrodes.

17. An interfacial component detection apparatus according to claim 1 including a third electrode disposed on the second solid portion between the second solid portion and the interfacial layer wherein the sensing means comprises means for applying a varying magnitude voltage signal across the first and third electrodes and means for measuring current flow between the second and third electrodes as the voltage of the signal is varied.

18. An interfacial component detection apparatus according to claim 1 wherein the first solid portion is a slider having a magnetic head and the second solid portion is an information storage disk.

19. An interfacial component detection apparatus according to claim 7 wherein the sensing means comprises means for applying a signal of varying frequency across the first electrode and the electrically conducting member and for sensing impedance between the first electrode and the electrically conducting member as the frequency of the signal is varied.

20. An interfacial component detection apparatus according to claim 7 wherein the sensing means comprises means for applying a constant voltage signal across the first electrode and the electrically conducting member and for measuring electrical current flowing between the first electrode and the electrically conducting member until the current decreases to zero.

21. An interfacial component detection apparatus according to claim 7 wherein the sensing means comprises means for applying a signal to establish a constant current flow between the first electrode and the electrically conducting member and for measuring total electrical charge flow between the first electrode and the electrically conducting member while a constant voltage is applied across the first electrode and the electrically conducting member.

22. An interfacial component detection apparatus according to claim 7 wherein the sensing means comprises means for sensing a signal generated across the first electrode and the electrically conducting member.

23. An interfacial component detection apparatus according to claim 8 wherein the electrically conducting member is an electrically conducting information storage disk.

24. An interfacial component detection apparatus according to claim 8 comprising an information storage disk, wherein the electrically conducting member comprises an electrically conducting layer on a surface of the disk opposing the slider.

* * * * *